Sept. 30, 1969　　　　　J. H. THORP　　　　　3,469,270
BOOK PRESSING MACHINE WITH IMPROVED PRESSER PLATE AND CONVEYOR
MECHANISM AND WITH IMPROVED DUAL CHANNEL ARRANGEMENT
Filed Oct. 20, 1967　　　　　　　　　　　　　　5 Sheets-Sheet 1

INVENTOR.
JAMES H. THORP
BY
McCormick, Paulding & Huber
ATTORNEYS

Sept. 30, 1969 J. H. THORP 3,469,270
BOOK PRESSING MACHINE WITH IMPROVED PRESSER PLATE AND CONVEYOR
MECHANISM AND WITH IMPROVED DUAL CHANNEL ARRANGEMENT
Filed Oct. 20, 1967 5 Sheets-Sheet 4
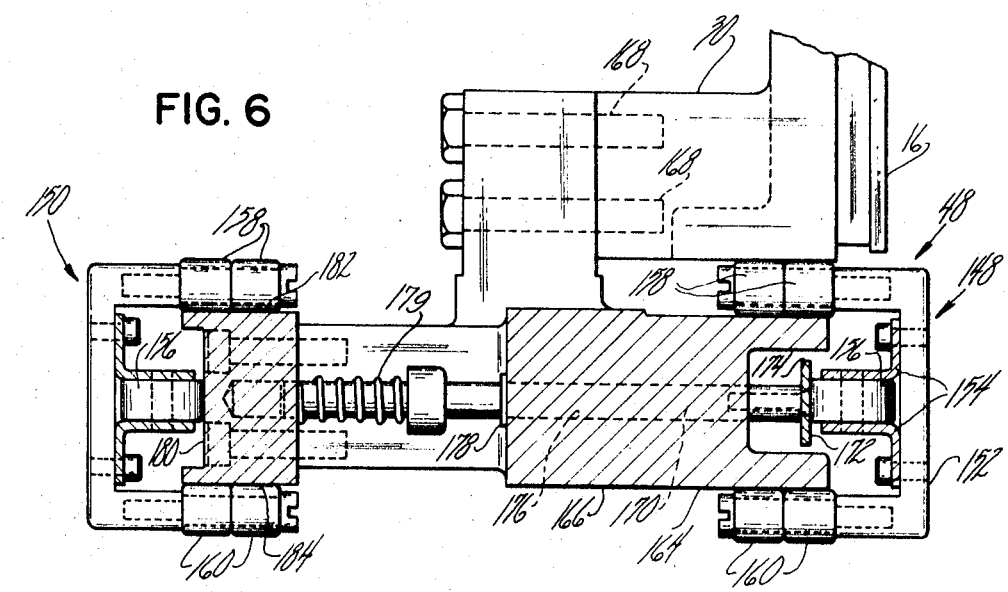
FIG. 6
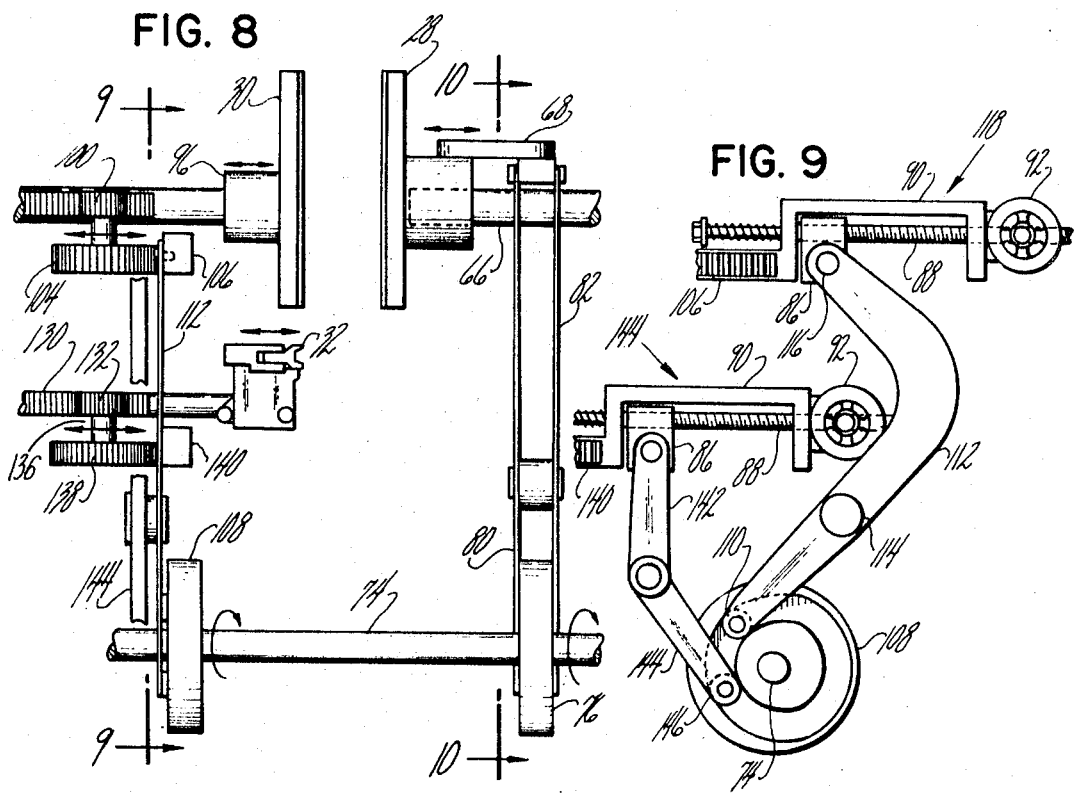
FIG. 8
FIG. 9

United States Patent Office 3,469,270
Patented Sept. 30, 1969

3,469,270
BOOK PRESSING MACHINE WITH IMPROVED PRESSER PLATE AND CONVEYOR MECHANISM AND WITH IMPROVED DUAL CHANNEL ARRANGEMENT
James H. Thorp, West Hartford, Conn., assignor to The Smyth Manufacturing Company, Bloomfield, Conn., a corporation of Connecticut
Filed Oct. 20, 1967, Ser. No. 676,769
Int. Cl. B42C 19/00
U.S. Cl. 11—1                14 Claims

ABSTRACT OF THE DISCLOSURE

A book pressing machine with a series of pressing and creasing stations and with an intermittently movable continuous conveyor of the slatted type. Presser plates and creaser irons engage and press part of the book side area and the conveyor engages and presses the remaining portion of the side area. The machine is of the dual channel type and all presser plates move to engage and disengage books, a common drive being provided for adjacent inner series of plates.

BACKGROUND OF INVENTION

Book pressing machines have been provided with pressing and creasing stations arranged in series, each station having a pair of opposing creaser irons, and various book transfer devices have been employed to transport books seriatum from station to station. Conventionally, book transfer devices operate intermittently and alternately with the pressing and creasing operations carried out in the machine, the book engaging elements of the devices gripping a book at one station, advancing the book to a subsequent station, releasing the book and then returning to the previous station for engagement and advancement of a succeeding book. Creaser irons have also been used for transferring books, and in at least one known type of pressing machine creaser irons are adapted to engage and advance the same to a subsequent pressing station, release the book, and then return for pick-up and advancement of a succeeding book. Pressing machines of the type mentioned have been generally satisfactory in the past but certain problems have been encountered with the book transfer devices employed. The repetitive grip and release operations of the transfer devices require precise control in order to achieve the necessary accuracy of registry of the books between presser plates at succeeding stations. Moreover, transfer devices of the type mentioned are inherently limited with regard to improvement in the overall speed of operation of the machine. The necessary back-and-forth movement of the transfer devices, the grip and release operation, and the necessity to provide clearance for presser plate movement into and out of engagement with book sides in timed relationship with grip and release operations all combine to impose a severe limit on operational speed of the machine.

Dual channel book pressing machines have also been provided in the past wherein adjacent first and second series of pressing and creasing stations are arranged in parallel relationship. Innermost or adjacent presser plates have been maintained in fixed position, however, with the outermost presser plates movable inwardly in each channel to urge books against the innermost presser plates. Certain disadvantages have been encountered with such arrangements as for example in the maintenance of precise alignment and registry of books between the presser plates. In such machines, creaser irons have of course been provided in pairs with the presser plates at each station and the creaser irons of each pair have generally been adapted for inward movement in unison into engagement with the book from each side thereof. With each creaser iron moveable and with one fixed presser plate, there is of course a tendency for a twisting action on the book and the necessary precise alignment and registry for good pressing operation is not achieved.

SUMMARY OF INVENTION

One object of the present invention is to provide a book pressing machine wherein high speed and efficient operation is achieved in the elimination of the grip and release operation of a book transfer device, a book transfer device being provided wherein continuous engagement of the device with the book sides avoids problems of alignment and registry and eliminates the aforesaid back-and-forth operation of the device.

Another object of the invention resides in the provision of a dual channel book pressing machine wherein innermost or adjacent presser plates are moved into and out of engagement with book sides in timed relationship with corresponding movement of outermost presser plates, the aforesaid operation occurring in timed relationship with similar engaging and disengaging operation of creaser irons whereby to avoid twisting of books during the pressing and creasing operation, whereby to achieve highly efficient pressing and creasing results.

In fulfillment of the first above-stated object, presser plates are provided which engage and press a part of the side area of the books and creaser irons are provided for conventional operation. The remaining part of the side area of the books is engaged continuously by book engaging members of a transfer device and during at least a portion of the period of such engagement the said members serve to press the books in the manner of the presser plates whereby to accomplish efficient pressing of the books over their entire side areas. Efficient book pressing and high speed operation of the machine is thus achieved.

In fulfillment of the second object stated above, innermost or adjacent presser plates are provided with a common drive means for book engaging and disengaging movement in timed relationship with outermost presser plates and with movement of creaser irons provided at each pressing and creasing station. Excellent results are achieved in pressing and creasing and in high speed machine operation.

The drawings show a preferred embodiment of the invention and such embodiment has been described, but it will be understood that various changes may be made from the construction disclosed, and that the drawings, and description are not to be construed as defining or limiting the scope of the invention, the claims forming a part of this specification being relied upon for that purpose.

BRIEF DESCRIPTION OF THE DRAWING

FIG. 4 is a fragmentary longitudinal vertical section taken generally as indicated at 4—4 in FIG. 3 and showing creaser irons, a support member therefor, and a track associated with the support member.

FIG. 5 is a fragmentary end view taken generally as indicated at 5—5 in FIG. 3 and showing a creaser iron and an associated heating means.

FIG. 6 is a fragmentary transverse vertical section taken generally as indicated at 6—6 in FIG. 1 and showing details of a conveyor forming a part of a book transfer device.

FIG. 7 is a fragmentary horizontal section taken generally as indicated at 7—7 in FIG. 2 and showing a portion of the conveyor of FIG. 6.

FIG. 8 is a somewhat schematic fragmentary vertical transverse section taken generally as indicated at 8—8 in FIG. 1 and illustrating operating means for presser plates and creaser irons.

FIG. 9 is a somewhat schematic fragmentary vertical longitudinal section taken generally as indicated at 9—9 in FIG. 8 and further illustrating operating means for the presser plates and creaser irons.

General organization of the machine

Figure 1:
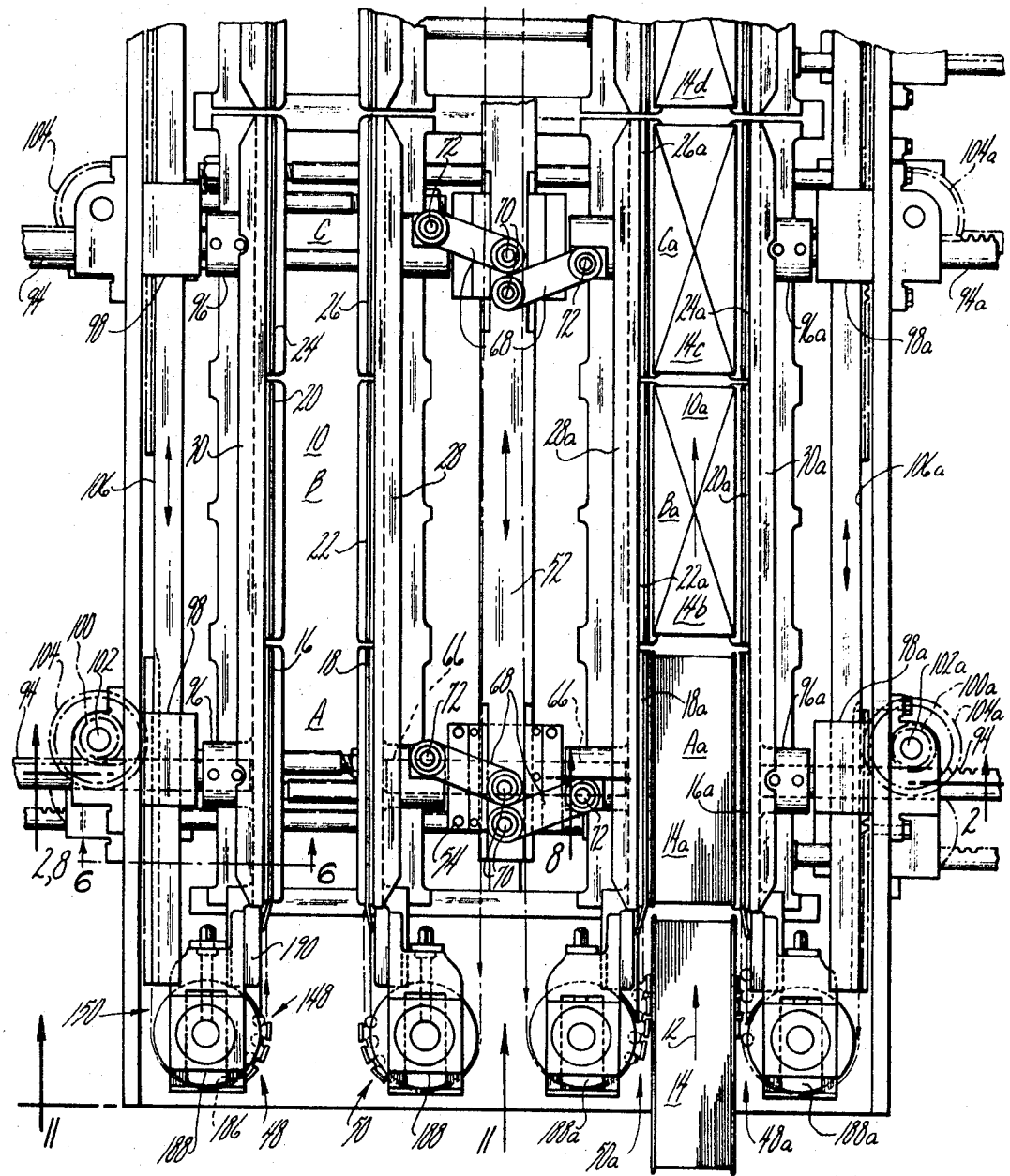
FIG. 1 is a fragmentary top view of a book pressing machine constructed in accordance with the present invention.

The book pressing machine partially shown in FIG. 1 is of the dual channel type and includes parallel adjacent and linear left and right hand book channels or passageways 10 and 10a. Each of the left and right hand channels 10, 10a is adapted to accommodate the intermittent longitudinal passage of a series of books in the direction indicated by the arrow 12. Books may be placed at the entrance end of the channels manually or, in accordance with the presently preferred practice, books can be advanced intermittently to the entrance end of the channels by automatic feed means not shown. For convenience of illustration the left hand channel 10 is shown empty while the right hand channel 10a is shown with a series of books 14, 14a, 14b, 14c, and 14d, it being understood that in normal operation of the machine books are passed through the two channels simultaneously and in identical manner.

Each of the channels 10 and 10a includes a longitudinal series of work stations and three such stations are illustrated in each channel but it will be apparent that any desired number of stations can be provided for by longitudinal extension of the machine. Stations are identified at A, B and C in the left hand channel 10 and at Aa, Ba, and Ca in the right hand channel 10a. At the station A similar outer and inner presser plates are shown at 16 and 18 and form an opposing pair of plates adapted for movement into and out of engagement with the sides of a book positioned at the station. Outer and inner plates 20, 22 at the station B operate in a similar manner as do outer and inner plates 24 and 26 at the station C. In the right hand channel 10a presser plates are or may be identical as to construction and arrangement with respect to the plates in the channel 10 and are accordingly similarly identified with the suffix a.

A first inner support member 28 extends longitudinally behind the inner presser plates 18, 22 and 26 and the said plates are mounted thereon for left and right hand movement therewith respectively for engagement and disengagement with the sides of books in the channel 10 at the stations A, B, and C. A first outer support member 30 extends longitudinally in a manner similar to the support member 28 and similarly mounts the outer presser plates 16, 20 and 24 for right and left hand movement therewith respectively for engagement and disengagement with book sides. Inner and outer support members 28a and 30a correspond in construction and operation with the support members 28 and 30 at the right hand channel 10a.

Figure 3:
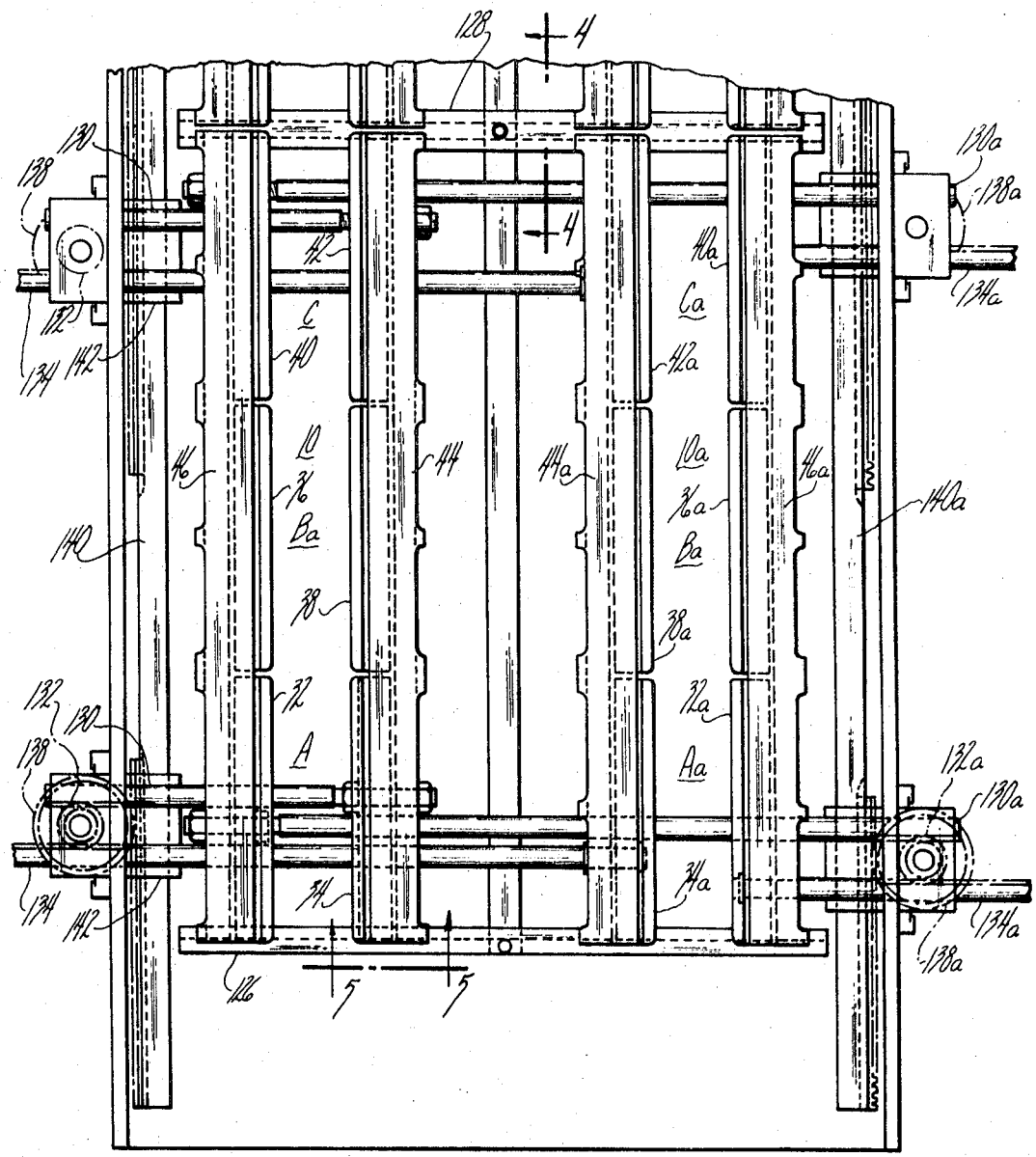
FIG. 3 is a fragmentary horizontal section taken generally as indicated at 3—3 in FIG. 2 and showing creaser irons and their support members.

In FIG. 3 an opposing pair of creaser irons are shown at 32, 34 in outer-inner relationship at the station A in the left hand channel 10. Similarly, creaser irons 36 and 38 are provided at the station B and irons 40, 42 at the station C. Creaser irons 32a through 42a correspond in the channel 10a. A first inner support member 44 carries the creaser irons 34, 38 and 42 and moves the same outwardly and inwardly into engagement with the joint areas of books in the channel 10 and a first outer support member 46 carrying the creaser irons 32, 36 and 40 performs a similar function with respect thereto. Support members 44a and 46a at the channel 10a correspond with the members 44, 46.

Figure 2:
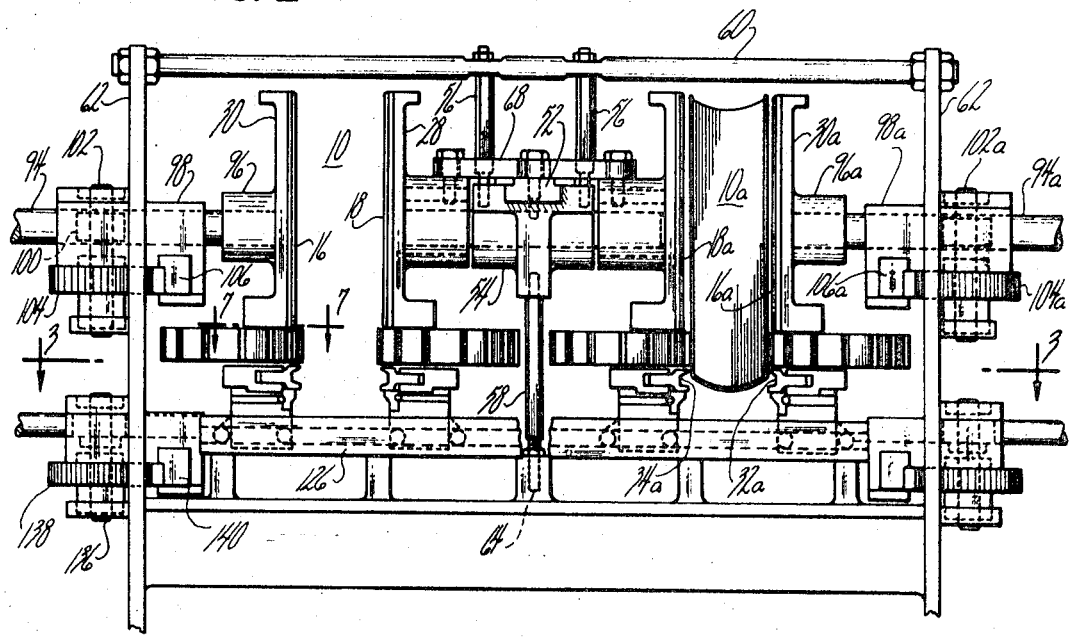
FIG. 2 is a fragmentary vertical transverse section of the machine taken generally as indicated at 2—2 in FIG. 1.

As best illustrated in FIG. 2 the presser plates extend vertically over a portion of the book sides but terminate in a downward direction short of the joint area leaving a longitudinally extending area of substantial vertical dimension between the lower edge of the plates and the creaser irons. Book engaging members of the book transfer devices engage the book sides in the area between the presser plates and the creaser irons and serve both to convey the books from station to station and to press the said area on the sides of the books. A book transfer device is provided for each of the channels 10, 10a and such devices are or may be identical. In the presently preferred form, each transfer device comprises a pair of similar intermittently movable continuous conveyors of the slatted type. Outer and inner or left and right hand conveyors at the channel 10 are indicated generally at 48 and 50 and similar conveyors for the channel 10a are indicated generally at 48a and 50a in FIG. 1.

Each of the conveyors 48, 50 and 48a, 50a has an inner or operative run and a return run. The inner or operative run is disposed vertically between the corresponding presser plates and creaser irons and engages and transports the books from station to station and also presses the aforesaid remaining portions or parts of the books sides. Pressure engagement of the inner runs with the book sides is varied so that a relatively light pressure is employed for transporting books and a substantial increase in pressure is effected when the books are at rest and engaged by the presser plates and creaser irons. The books are engaged by and precisely registered between the conveyors as they are introduced to the channels at the entry end thereof. Thereafter there is no disengagement of the conveyors from the books prior to discharge with the result that the books are precisely registered and aligned at each station in passage through the channels.

Presser plates and operating means therefor

The presser plates 16 through 26a may be identical and conventional in form with flat inner surfaces for engagement with and for pressing operation on the sides of books in the channels 10, 10a. The longitudinal extent of the presser plates is determined so as to accommodate books of different length, the books 14, 14a, 14b, 14c, and 14d being approximately the maximum size accommodated. In vertical extent, the plates terminate at lower end portions substantially above the backs of the books as mentioned previously and as best illustrated in FIG. 2. While the books are shown in a back-down attitude with transfer means and creaser irons disposed beneath the presser plates, it is nevertheless within the scope of the invention to rearrange elements in order to accommodate books in a back-up attitude in passage through the machine.

Operating means for the presser plates may vary widely within the scope of the invention, but it is important to note that the inner presser plates on the support members 28, 28a are movable laterally as well as the outer plates on the support members 30, 30a. Further, a common drive means is provided for the inner plates and their support members and preferably takes the form of a single longitudinally extending intermittently reciprocable drive bar 52, FIG. 1. The drive bar 52 is slidably mounted in appropriate support blocks 54, 54 in turn fixedly supported at a central portion of the machine by vertically extending upper and lower mounting rods indicated respectively at 56, 56 and 58. The mounting rods 56, 56, better shown in FIG. 2, extend upwardly from the blocks and are secured to a horizontal cross bar 60 in turn supported at outer end portions by upstanding vertical support members 62, 62. The lower support rod 58 extends downwardly from the blocks 54, 54 to the frame of the machine at 64.

Returning to FIG. 1, it will be observed that the presser plate support members 28, 28a are mounted on short laterally projecting side rods 66, 66 carried by the blocks 54, 54. Thus, the support members 28, 28a can be moved slidably in lateral directions into and out of engagement with books in the channels 10, 10a. For moving the support members 28, 28a in such a manner small toggle links 68, 68 are provided with inner end portions pivotally connected with the drive bar 52 at 70, 70. Outer end portions of the toggle links 68, 68 are pivotally connected at 72, 72 with the support members 28, 28a. As shown, the drive bar 52 and the toggle links 68, 68 are in position for maximum outward movement of the support members 28, 28a and for engagement of the presser plates with books in the channels 10, 10a. On longitudinal movement of the drive bar 52 in a downward direction in FIG. 1, the toggle links are operated to withdraw the support members 28, 28a inwardly whereby to withdraw presser plates from engagement with books in the channels 10, 10a.

Figure 10:
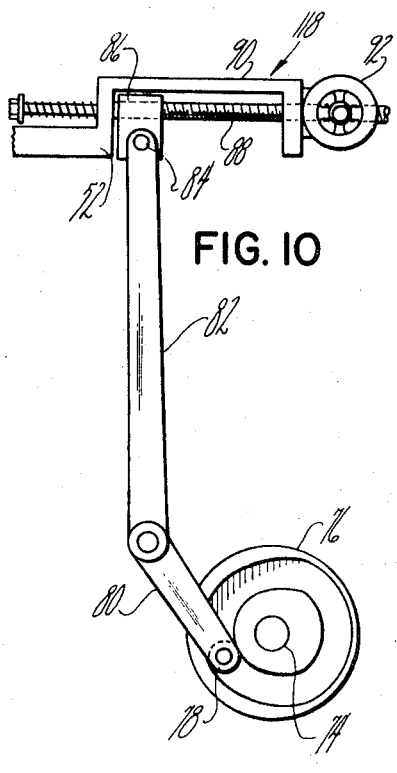
FIG. 10 is a somewhat schematic fragmentary vertical longitudinal section taken generally as indicated at 10—10 in FIG. 8 and further illustrating operating means for the presser plates.

Referring now to FIGS. 8 and 10, it will be observed that a main camshaft is provided at 74 for rotatably driving a cam 76 having an associated follower 78 at one end portion of a link 80. At its opposite end portion the link 80 is connected with an oscillatable lever 82, in turn connected at an opposite end portion 84 with the drive bar 52. Connection of the end portion 84 of the oscillatable lever 82 with the drive bar 52 is effected through an adjustment means comprising a traverse block 86 threadably engaged with a lead screw 88 which is rotatable in but fixed against axial movement with respect to a bracket 90. The bracket 90 is in turn fixedly connected with the drive bar 52, and a hand wheel and suitable conventional gearing is provided at 92 for rotating the lead screw 88 whereby to effect axial movement of the block therealong and to adjust the start or out positions of the support members 28, 28a and the associated presser plates. As will be apparent, gang adjustment of the presser plates is thus effected for accommodation of books of different thickness in the channels 10, 10a and; moreover, such adjustments are capable of accomplishment even with the machine in operation.

Operating means for the outer presser plates carried by the support members 30, 30a move the plates into and out of engagement with books in the channels 10, 10a in timed relationship with the movement of the inner plates and the support members 28, 28a and such means are preferably identical for the two members 30, 30a. Accordingly, it is necessary only to describe an operating means for one of the members 30, 30a and attention is invited to the left-hand member 30 for such description. Corresponding operating elements relating to the right-hand member 30a are identified with like reference numerals but with the suffix a.

Longitudinally spaced short laterally extending secondary drive racks 94, 94 are fixedly connected with the support member 30 at their inner end portions in suitable bosses 96, 96 spaced longitudinally on the member, FIG. 1. The racks 94, 94 are slidably supported in suitable mounting blocks 98, 98 and, at outer end portions thereof, drive pinions 100, 100 are engaged respectively with the racks 94, 94. The drive pinions 100, 100 are supported on and rotated by short vertically extending shafts 102, 102 which extend beneath the racks 94, 94 and which also carry drive gears identified at 104, 104. The gears 104, 104 in turn mesh with and are driven by a primary drive rack 106 which extends longitudinally in the machine and which is reciprocated intermittently to urge the support member 30 and its associated presser plates inwardly and outwardly as required for book engagement and disengagement.

Referring to FIGS. 8 and 9, it will be observed that the camshaft 74 also carries a cam 108 having an associated follower 110 at one end portion of an oscillatable lever 112 pivotally supported at 114. At an opposite end portion the lever 112 is connected at 116 to an adjustment mechanism 118, which may be substantially identical with the mechanism described above for the drive bar 52, and which in turn is connected with the primary drive rack 106.

Creaser irons and operating means therefor

The creaser irons 32 through 40a may be substantially identical in construction and arrangement and the creaser iron 34 shown in transverse section in FIG. 5 may be taken accordingly as representative of the remaining creaser irons in the machine. The creaser iron 34 is shown in FIG. 5 mounted on its support member 44 and provided with an electrical heating unit 120. The heating unit 120 has an associated heat conductor element 12 which is maintained in close engagement with a lower surface of the creaser iron 34 to provide the necessary heating of the iron for efficient creasing operation. At a lower portion the support member 44 carries a pair of small guide and support rollers 122, 122. The rollers 122, 122 are entered in a suitable elongated guide slot 124 in a first transversely extending guide and support member 126. The guide and support member 126 has a counterpart member at 128 at an upper or rear portion of the machine in FIG. 3. As will be apparent, precise positioning of the creaser irons and accurate lateral movement thereof into and out of engagement with the books in the channels 10, 10a is provided for by means of the rollers 122, 122 and the guide members 126, 128.

Operating means for the creaser irons are best illustrated in FIGS. 2, 3, 8 and 9 and the machine is provided with left and right-hand operating means respectively for the support members 44, 44a and the support members 46, 46a. The left and right-hand operating means are identical and it will therefore suffice to describe the left-hand operating means, the right-hand means having like elements identified by like reference numerals but with the suffix a.

First secondary drive racks 130, 130 in FIG. 3 operate the creaser iron support member 44 and extend transversely in the machine with inner end portions connected with the said support member. At outer end portions, the drive racks 130, 130 are engaged by and reciprocably driven by small pinions 132, 132. Second secondary drive racks, also engaged with and driven by the pinions 132, 132, but on an opposite side thereof and in an opposite direction, are shown at 134, 134. The racks 134, 134 extend transversely in the machine and have inner end portions connected with the support member 44a. As best shown in FIGS. 2 and 8, the pinions 132, 132 are mounted on short vertical drive shafts 136, 136 which have drive gears 138, 138 at lower end portions and which are rotated by engagement of the drive gears with a primary drive rack 140. The primary drive rack 140 extends longitudinally in the machine and is slidably supported in suitable mounting blocks 142, 142.

As is best illustrated in FIGS. 8 and 9 the drive rack 140 is reciprocated intermittently by means of an oscillatable lever 142 connected with the rack through an adjustment mechanism 144. The adjustment mechanism 144 may be identical with the aforementioned mechanism 118. The oscillatable lever 142 is in turn operated by a link 144 carrying a cam follower 146 operatively associated with the cam 108.

As will be apparent, suitably timed reciprocation of the primary drive rack 140 will result in corresponding reciprocation of the first and second secondary drive racks 132, 132 and 134, 134 and in movement of the support members 44, 44a in opposite directions that is; the support member 44 will be urged leftwardly or outwardly in FIG. 3 whereby to urge its creaser irons into engagement with books in the channel 10 while the support member 44a will be simultaneously urged rightwardly or outwardly to urge its creaser irons into engagement with books in the channel 10a.

Book transfer device

As previously mentioned, the book transfer device comprises conveyors 48 50, 48a, and 50a which are substantially identical and, accordingly, a single conveyor 48 will be described hereinbelow with particular reference to FIGS. 1, 2, 6, 7, and 11. As best illustrated in FIG. 6, the conveyor 48 has an operative run 148 and a return run 150. The conveyor is of the continuous type, albeit movable intermittently, and remains in continuous engagement with book sides in the channel 10. Book engaging members take the form of small slats 152, 152, FIG. 7, which flatly engage book sides and which are interconnected by means of a continuous member 154. The member 154 journals a series of small longitudinally spaced rollers 156, 156 about vertical axes and certain of the slats 152 spaced apart along the length of the conveyor journal upper and lower sets of small rollers about horizontal axes. The upper rollers are identified at 158, 158 and the lower rollers at 160, 160, FIG. 6. The upper and lower rollers 158, 160 respectively engage roller surfaces 162 and 164 formed on a conveyor support member 166 in turn fixedly attached at 168, 168 to the presser plate support member 30 at a lower portion of the latter. Thus, the slats 152, 152 of the conveyor are maintained in closely spaced relationship with the lower edge portion of presser plates such as the plate 16 shown in FIG. 6. For a reason to be set forth hereinbelow, the slats 152, 152 are movable laterally with respect to the support member 166 and, accordingly, the roller surfaces 162, 164 are extended laterally to accommodate lateral sliding movement of the rollers 158, 160 as well as rolling movement thereof.

The rollers 156, 165 are employed in transmitting a biasing force to the slats 152, 152 and in driving the conveyor. Thus, a biasing member is provided at 170 and a flat roller engaging surface is provided at 172. The surface 172 may of course be provided on an elongated longitudinally extending attachment such as 174 with the biasing member 170 fixed thereto and extending slidably through an appropriate opening 176 in the support member 166. At a portion thereof spaced from the rollers 156, 156 the biasing member 170 has a stop 178 to limit movement of the member in the direction which effects slat movement into engagement with books. A biasing spring 179 associated with the member 170 urges the said member in the direction of slat engagement with the sides of books in channel 10. On the return run, the rollers 156, 156 engage a surface 180 on the support member and the upper and lower rollers 158, 160 engage suitable surfaces 182 and 184 respectively.

From the foregoing, it will be apparent that the slats 152, 152 in the operative run 148 of the conveyor are urged inwardly into the channel 10 beyond the presser plates such as the plate 16 when the plates are withdrawn from engagement with the sides of books in the channel. The pressure exerted by the slats upon the book sides is of course determined by selection of the spring 180 and is so selected that firm engagement is maintained for transport of the books from station to station in the channel. When the presser plates are urged inwardly in the channel to engage the sides of the books, the slats 152, 152 on the operative run 148 are of course maintained in engagement with the book sides but are moved outwardly relative to the presser plates so as to reside substantially in a common plane with the plates. Such relative outward movement of the slats 152, 152 of course results in further compression of the spring 180 and in increased pressure exerted upon the sides of the book by the slats. Thus, the slats serve to efficiently press the underlying area of the sides of the books with the result that the entire side area of the books is pressed in the desired manner.

The number of biasing members such as 170 may of course vary in accordance with the length of the pressing machine and the necessary length of the conveyor. Further, other means for biasing book engaging members such as the slats 152, 152 into engagement with book sides are contemplated within the scope of the invention. Reverting to the surfaces 162, 164, and the lateral extent thereof beyond rollers 158 and 160, it will be apparent that such surfaces accommodate the necessary lateral sliding movement of the rollers when the operative run of the conveyor is moved relative to the presser plates.

The second above-mentioned function of the rollers 156, 156 is fulfilled through engagement of the rollers with small circumaxially spaced partially cylindrical recesses 186, 186 in a sprocket wheel 188 adapted to drive the conveyor 38. The sprocket 188 is shown at a lower end portion of the machine in FIG. 1 and an idle wheel, not shown, is of course provided for the conveyor at an opposite end portion of the machine. The sprocket wheels associated with the conveyor are mounted on and movable with the support member 30 by means of suitable brackets 190 and a drive shaft for the wheel 188 extends vertically at 191 and has an intermediate gear 192 mounted at a lower end portion thereof.

Figure 11:
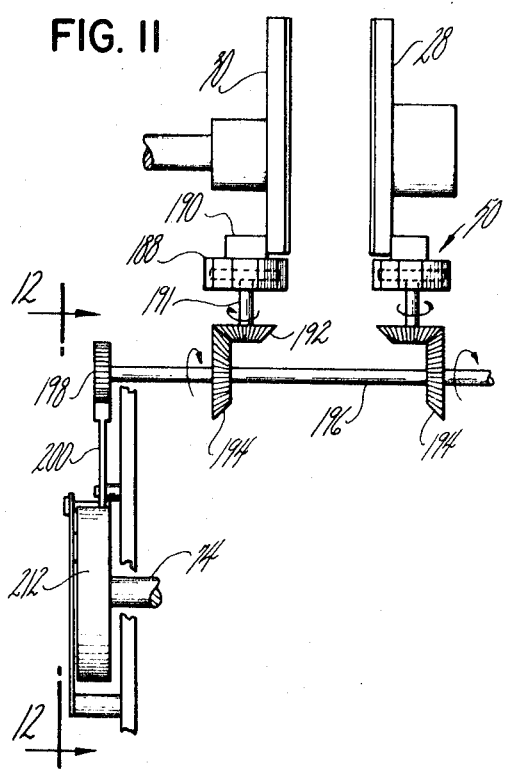
FIG. 11 is a somewhat schematic fragmentary vertical transverse section taken generally as indicated at 11—11 in FIG. 1 and illustrating operating means for the book transfer device.

As best shown in FIG. 11, the gear 192 is movable laterally inwardly and outwardly with the bracket 190 and the support member 30 and is driven intermittently from a gear 194. The drive gear 194 is mounted upon a horizontally extending shaft 196 in a fixed axial position so that inward movement of the support member 30, the bracket 190 and the intermediate gear 192 serves to disengage the said gear from the drive gear 194. Conversely, outward movement of the said elements serves to drivingly engage the gears for rotation of the sprocket wheel 188 and for book advancing conveyor movement. Thus, the conveyor slats 152, 152 are prevented from sliding over the underlying book side areas in an abrasive manner when the books are at rest at pressing stations with presser plates, creaser irons, and conveyor slats working thereon in a pressing and creasing operation.

Figure 12:
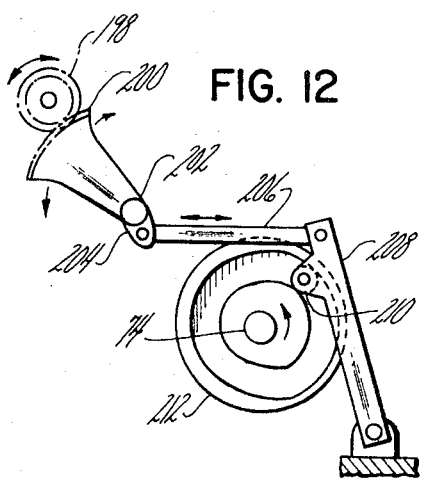
FIG. 12 is a somewhat schematic fragmentary vertical longitudinal section taken generally as indicated at 12—12 in FIG. 11 and further illustrating the operating means for the book transfer device.

For rotating the shaft 196 a gear is provided at 198 and has an associated gear segment 200, FIG. 12, swingably mounted at 202 for oscillatable operation by means of a short link 204, a connecting link 206 adn a lever 208 which carries a cam follower 210. The cam follower 210 is engaged with the track of a cam 212 mounted upon the aforementioned camshaft 74. Thus, the gear 198 is operated to cause the conveyor 48 to advance books from station to station in the channel 10 in suitably timed relationship with other machine operations by means of oscillation of the segment 200 through the elements 204, 206, 208, 210 and the cam 212. A second gear 194 is shown on the shaft 196 in FIG. 11 for similarly driving the conveyor 50 and it will be apparent that like driving means is provided for the conveyors 48a and 50a.

I claim:
1. A book pressing machine having a series of pressing and creasing stations and comprising a pair of spaced presser plates at each pressing and creasing station, means for effecting relative movement between the presser plates of each pair whereby to engage and disengage opposite sides of a book at the pressing and creasing station, each of said presser plates being of such size and shape as to engage a side of a book throughout an area somewhat less than the entire area of the book side, a pair of spaced creaser irons at each pressing and creasing station, means for effecting relative movement between the creaser irons of each pair whereby to engage and disengage opposite sides of a book at the creasing and pressing station, and a book transfer device operable to advance books intermittently from station to station, said transfer device including spaced book engaging members which contact opposite sides of each book over those areas which are not engaged by the presser plates and creaser irons and which are maintained in engagement with each book both during transfer and during pressing and creasing of the book, and said transfer device also including means for urging said members against the book sides under substantial pressure to accomplish pressing over the areas of the book sides engaged thereby, said means including resilient biasing means such that plate movement into engagement with a book side substantially increases the pressure engagement of a connected member with a book side.

2. A book pressing machine as set forth in claim 1 wherein said book engaging members are connected with said presser plates in such a manner that they project inwardly beyond the plates into engagement with book sides when the latter are withdrawn from engagement with book sides, and wherein said resilient biasing means comprise back-up springs continuously urging the book engaging members inwardly, said springs being effected by plate movement into engagement with a book whereby to provide the aforesaid substantial increase in pressure engagement between a connected member and a book side.

3. A book pressing machine as set forth in claim 2 wherein said pressing and creasing stations are arranged in a linear series with a first series of presser plates which constitute corresponding halves of plate pairs mounted on a first support member and with a second series of presser plates which constitute the remaining halves of said plate pairs mounted on a second and opposing support member, and wherein said book engaging members of said transfer device are connected with the presser plates as aforesaid by means of back-up spring connection with said support members.

4. A book pressing machine as set forth in claim 3 wherein said book transfer device comprises at least one intermittently movable endless conveyor of the slatted type having operative and return runs the former of which extends seriatum adjacent the plates of said first series of presser plates, and wherein said book engaging members take the form of individual conveyor slats arranged flatly to engage book sides.

5. A book pressing machine as set forth in claim 4 wherein each of said support members is movable to urge presser plates thereon toward and away from books disposed therebetween, and wherein said transfer device comprises first and second endless conveyors arranged respectively on said support members as aforesaid.

6. A book pressing machine as set forth in claim 5 wherein each of said conveyors has associated sprocket wheels mounted on and movable with the corresponding support members.

7. A book pressing machine as set fourth in claim 6 wherein each of said conveyors comprises a series of small rollers engageable with slidable biasing members carried by said support member and acted upon by back-up springs to exert a force upon the rollers and thus urge the conveyor slats flatly into engagement with the book sides.

8. A book pressing machine as set forth in claim 7 wherein each of said conveyors also includes small rollers engageable with surfaces on said support members to restrain the conveyors against lateral movement toward and away from adjacent presser plates.

9. A book pressing machine as set forth in claim 6 wherein at least one sprocket associated with each conveyor has an intermediate gear drivingly connected therewith and movable therewith in one and an opposite direction on movement of the associated support member, each said gear having an associated drive gear rotatable about a fixed axis and located to be engaged by and to drive the intermediate gear and its sprocket when the support member is moved to disengage the presser plates from the book sides, said drive and intermediate gears being disengaged on movement of the support member to engage the presser plates with the book sides.

10. A dual channel book pressing machine having parallel and adjacent first and second linear series of pressing and creasing stations, a pair of spaced presser plates and a pair of spaced creaser irons at each of said stations, a transfer device for each series of stations operable to advance books intermittently from station to station, an inner support member for each series of stations carrying a first series of presser plates which constitute corresponding halves of plate pairs of said series, an outer support member for each series of stations conveying a second series of presser plates constituting the remaining halves of said plate pairs, common means for moving said inner support members respectively outwardly and inwardly and into and out of engagement with the sides of books at said stations, and means for moving said outer support members respectively inwardly and outwardly and into and out of engagement with the sides of books at said stations, said support member moving means being operable in timed relationship with said book transfer device whereby alternately to advance and press books.

11. A dual channel book pressing machine as set forth in claim 10 wherein said common means for moving said inner support members comprises an elongated bar which is driven reciprocally in timed relationship with said book transfer device, and at least two toggle links connected at inner ends with said bar and connected respectively at outer ends with said inner support members.

12. A book pressing machine as set forth in claim 10 wherein inner and outer support members are provided for the creaser irons of each series of stations, and wherein means is provided for moving said support members to urge the creaser irons thereon into and out of engagement with book sides in timed relationship with the like movement of the aforesaid presser plates.

13. A book pressing machine as set forth in claim 10 wherein said book transfer device comprises an intermittently movable endless conveyor of the slatted type associated with each support member, each of said conveyors having operative and return runs the former of which extends seriatum adjacent the presser plates of its associated support member, and each of said conveyors having associated resilient biasing means operable continuously to urge the conveyor slats flatly into engagement with the book sides, said biasing means being connected with the corresponding support member in such manner that slat pressure on the book sides is substantially increased to press the books on movement of the support member urging its presser plates into engagement with the book sides.

14. A book pressing machine as set forth in claim 13 wherein each of said conveyors has a drive sprocket which carries an intermediate gear and which is mounted on the corresponding support member for movement therewith, and wherein a rotatable drive shaft is provided with a plurality of rotatable but fixed position drive gears respectively for driving said intermediate gears, said intermediate and drive gears being engaged and disengaged respectively on movement of support members effecting presser plate book disengagement and engagement for alternate book pressing and advancing operation.

References Cited

UNITED STATES PATENTS

| | | |
|---|---|---|
| 2,921,322 | 1/1960 | Crawley et al. |
| 2,939,161 | 6/1960 | Schoenberger. |
| 3,016,550 | 1/1962 | Schramm. |
| 3,123,848 | 3/1964 | Smith et al. |

LAWRENCE CHARLES, Primary Examiner